United States Patent [19]

Hoyt

[11] 4,212,068

[45] Jul. 8, 1980

[54] SYSTEM FOR CALCULATING AND DISPLAYING SALES INFORMATION

[76] Inventor: Clifton A. Hoyt, P.O. Box 1280 Star Rte.; Solon Springs, Wis. 54873

[21] Appl. No.: 803,346

[22] Filed: Jun. 3, 1977

[51] Int. Cl.² .......................... G06F 15/56; B67D 5/08

[52] U.S. Cl. ........................................ 364/465; 222/23; 222/28; 222/36; 364/479

[58] Field of Search .................. 364/465, 479; 222/23, 222/28, 29, 30, 32, 36

[56] References Cited

U.S. PATENT DOCUMENTS

| | | | |
|---|---|---|---|
| 3,813,527 | 5/1974 | Langston | 364/465 |
| 3,895,738 | 7/1975 | Buchanan et al. | 222/28 X |
| 3,935,435 | 1/1976 | Greenwood | 222/23 X |
| 4,051,998 | 10/1977 | Zabel | 364/465 |
| 4,074,356 | 2/1978 | Schiller et al. | 364/465 |

*Primary Examiner*—Jerry Smith

*Attorney, Agent, or Firm*—Wegner, Stellman, McCord, Wiles & Wood

[57] ABSTRACT

A system for computing and displaying quantity and cost of a liquid flowing through a pipe, as gasoline delivered to a consumer. A detector responsive to the passing of a predetermined quantity of the liquid provides a pulse function to money and quantity set circuits. The money and quantity set circuits simultaneously provide signals representative of the units (i.e., gallons) and cost (i.e., dollars) each time a pulse function is received. The signals are accumulated in a memory and the totals are added to subsequently received signals to update the memory each time the predetermined quantity has passed. A nonvolatile totals memory provides a running total of cost and quantity and a sequentially operated display provides a visual display of cost, quantity and totals.

11 Claims, 9 Drawing Figures

Fig. 1.
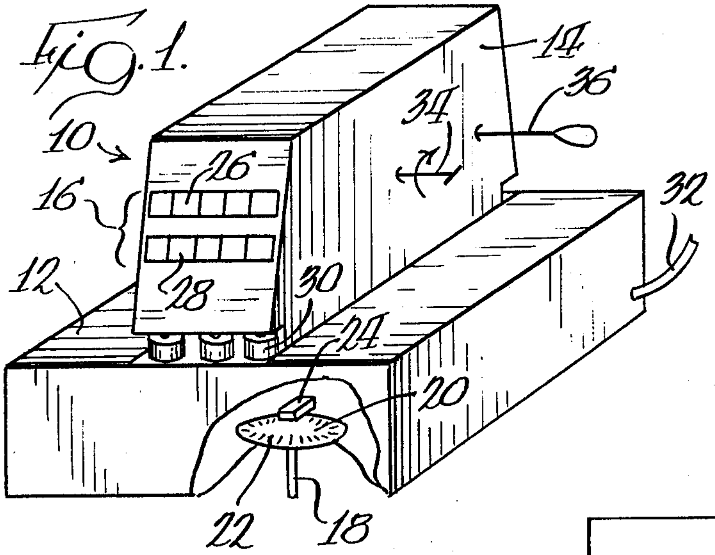
Fig. 3.
| | |
|---|---|
| FIG. 3A. | FIG. 3B |
| FIG. 3C. | FIG. 3D. |
Fig. 4.
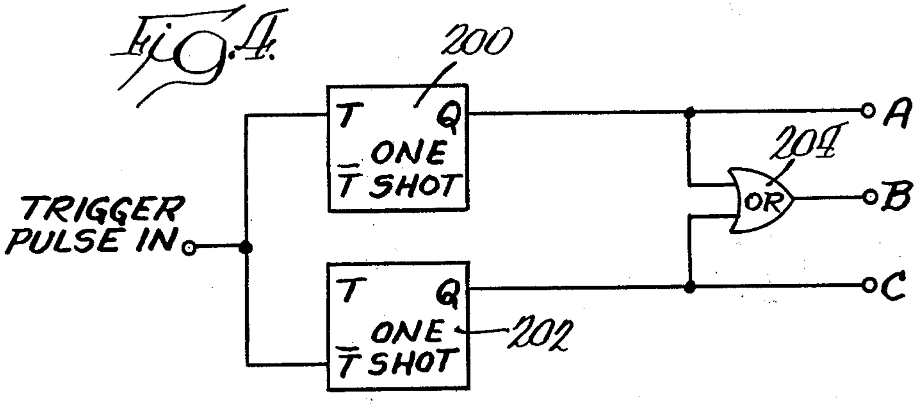
Fig. 5.
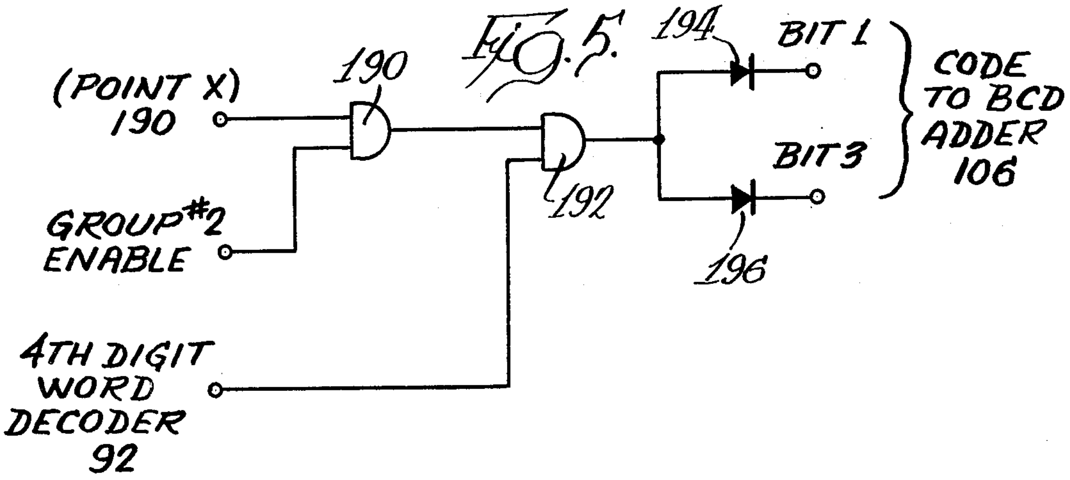

10
CLOCK CIRCUIT
38
MONEY AND QUANTITY PULSAR
40
24
20
22
18
MONEY SET CIRCUIT
42
INITIAL ROUND-OFF INJECTION
58
QUANTITY SET CIRCUIT
44
MONEY MEMORY
48
MONEY ADDER
46
QUANTITY ADDER
54
QUANTITY MEMORY
56
MONEY AND QUANTITY RESET SWITCH
62
NON-VOLATILE TOTALS MEMORY
52
TOTALS READ SWITCH
64
SEVEN SEGMENT DECODER
50
16
26
28
DIGIT SEQUENCING CIRCUIT
60

154
156
QUAD "D" LATCH
PRICE 16X4 RAM
88
LATCH FLIP FLOP
108
110
BCD ADDER
106
DATA BUSS
112
EMERGENCY READ OUT
188
+12VDC
+13VDC
12 VOLT
186
REGULATED POWER SUPPLY
184
117V A.C.
104
102
98

1 SEC. OSC.
168
TOTALS
64
RESET
62
70
20
22
18
FLOW METER
Q3 Q1 Q2 Q0
4 BIT COUNTER
CP
R
170
130
SCHMITT T TRIGGER
Q
72
IN
S CP
LATCH FLIP FLOP
D
128
74
162
B
76
R CP
LATCH FLIP FLOP
Q
D
164
132
136
166
PULSE FORMING CIRCUIT
78
138
P

SYSTEM FOR CALCULATING AND DISPLAYING SALES INFORMATION

This invention relates to systems which provide for arithmetic conversion and, more particularly, to a system which simultaneously calculates quantity and cost of a fluid passing through a pipe.

A system is often required to accurately and rapidly provide an arithmetic conversion from one unit to a second unit or from one unit to a second and a third unit. A gasoline pump computer having a device responsive to the passing of an incremental amount of gasoline to display total quantity and cost of the gasoline delivered to the consumer is an example of such a conversion system. The systems currently available have poor accuracy and it is difficult, if not impossible, to quickly change the units (i.e., from gallons to liters). Also, many existing systems are incapable of storing the running totals of quantity and cost for successive sales.

I have developed a system which provides an accurate and rapid arithmetic conversion from one unit (i.e., an increment of fluid) to another (i.e., a gallon) while simultaneously providing a conversion to a third unit (i.e., cost for the gallon delivered). The system is dependable and provides totals information of quantity and cost for successive sales and may be retrofitted into existing gasoline pumps.

It is a feature of the present invention to provide a quantitative conversion circuit capable of simultaneously providing updated quantity and cost information.

It is another feature of the present invention to provide a system which successively adds cost and quantity to accumulate a total in response to the passing of predetermined amounts of liquid.

Yet another feature of the present invention is to provide a circuit which initially adds a value to the cost memory for providing a prerounding function of the cost displayed.

Yet another feature of the present invention is to provide a system which drives the displays in a successive manner to simplify data transmission.

A further feature of the present invention is to provide a system having high resolution wherein the accuracy of the information displayed is as precise as the incremental amount of quantity being measured.

Another feature of the present invention is to provide a nonvolatile totals memory for maintaining a running total of quantity and the cost of the fluid measured.

Other features will become apparent when considering the drawing in which:

DRAWING

FIG. 1 is a perspective view of the computer and its housing;

Figure 2:
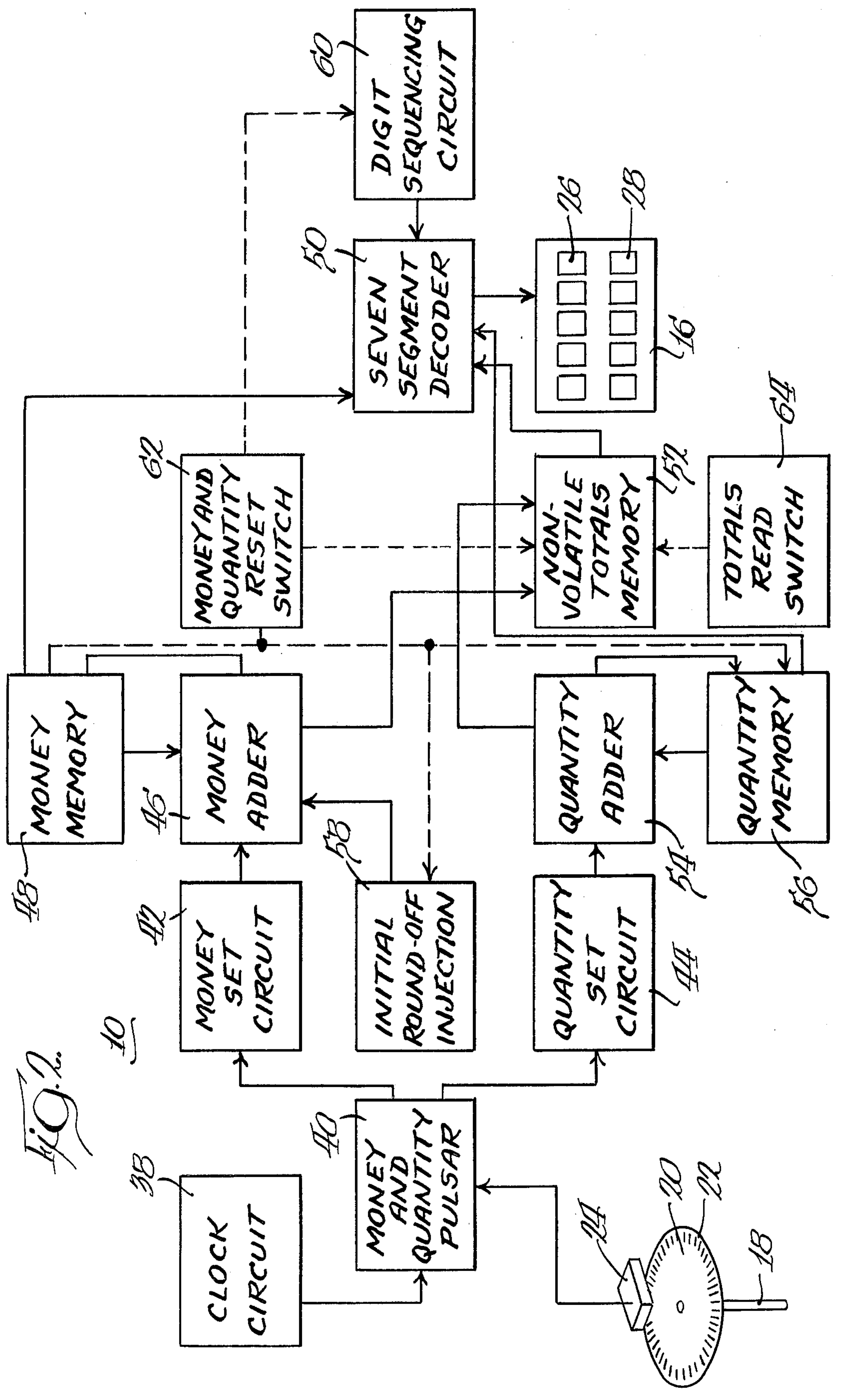
FIG. 2 is a simplified block diagram of the operation of the computer.
Figure 3A:
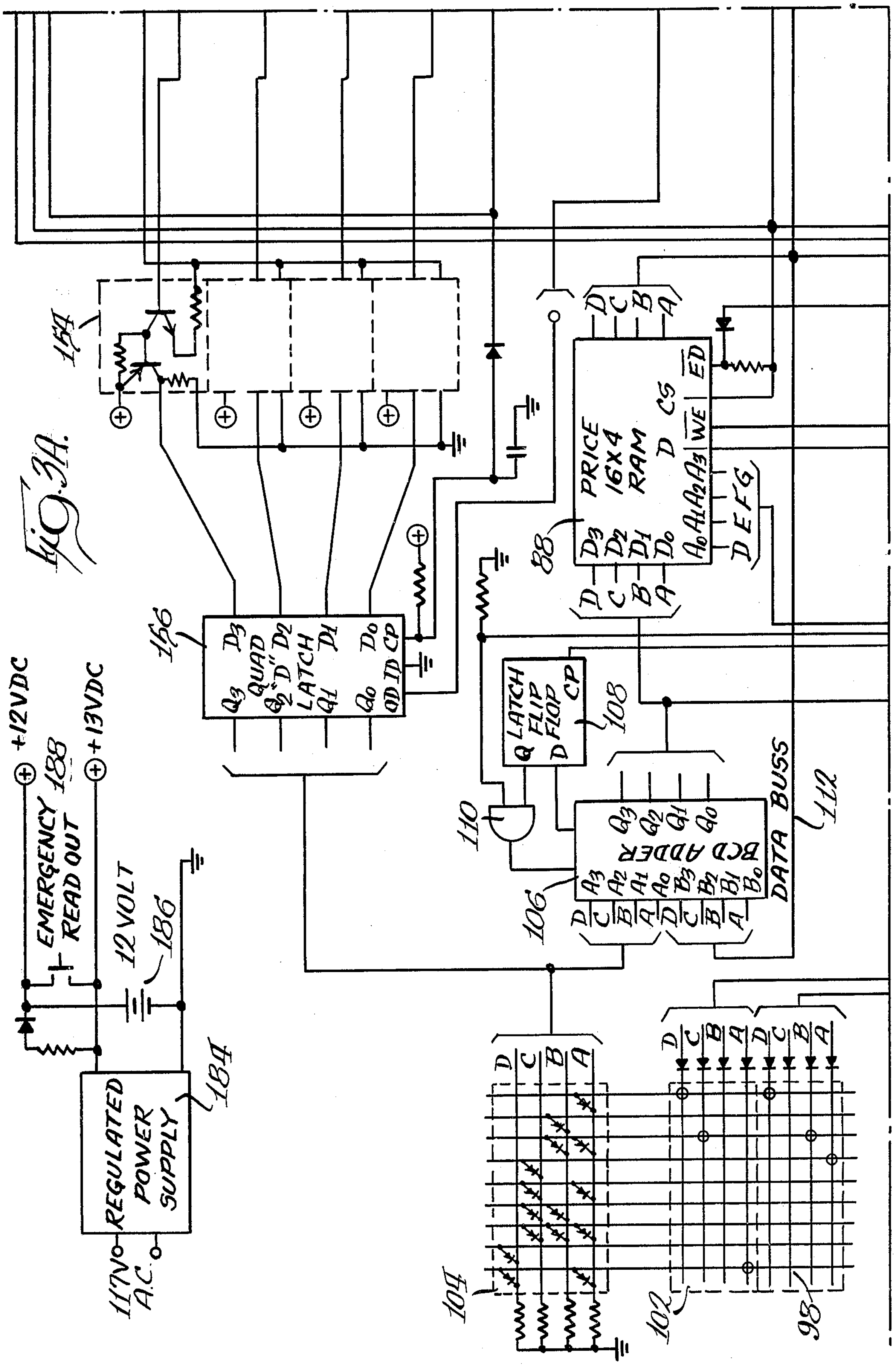
Figure 3B:
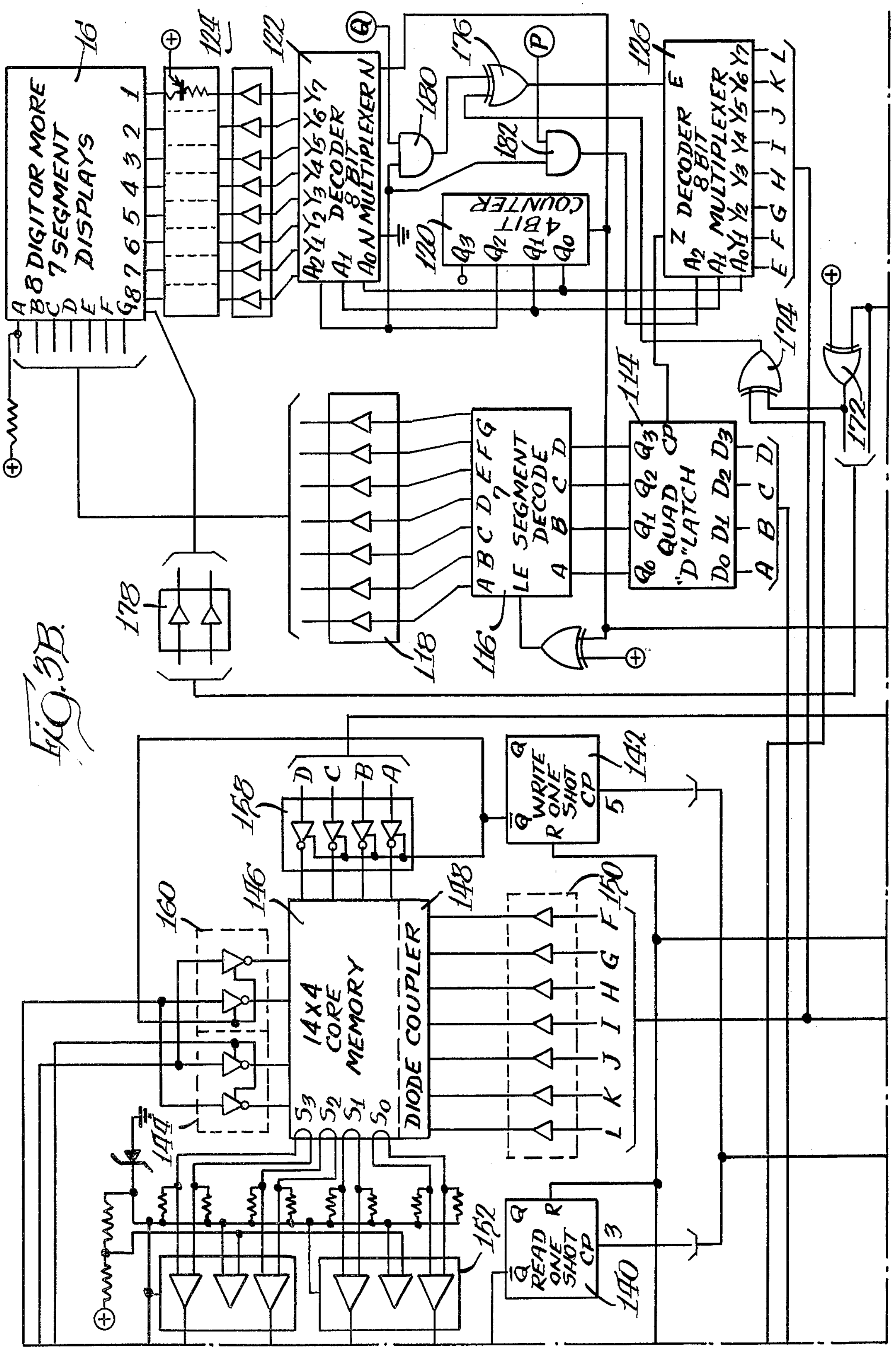
Figure 3C:
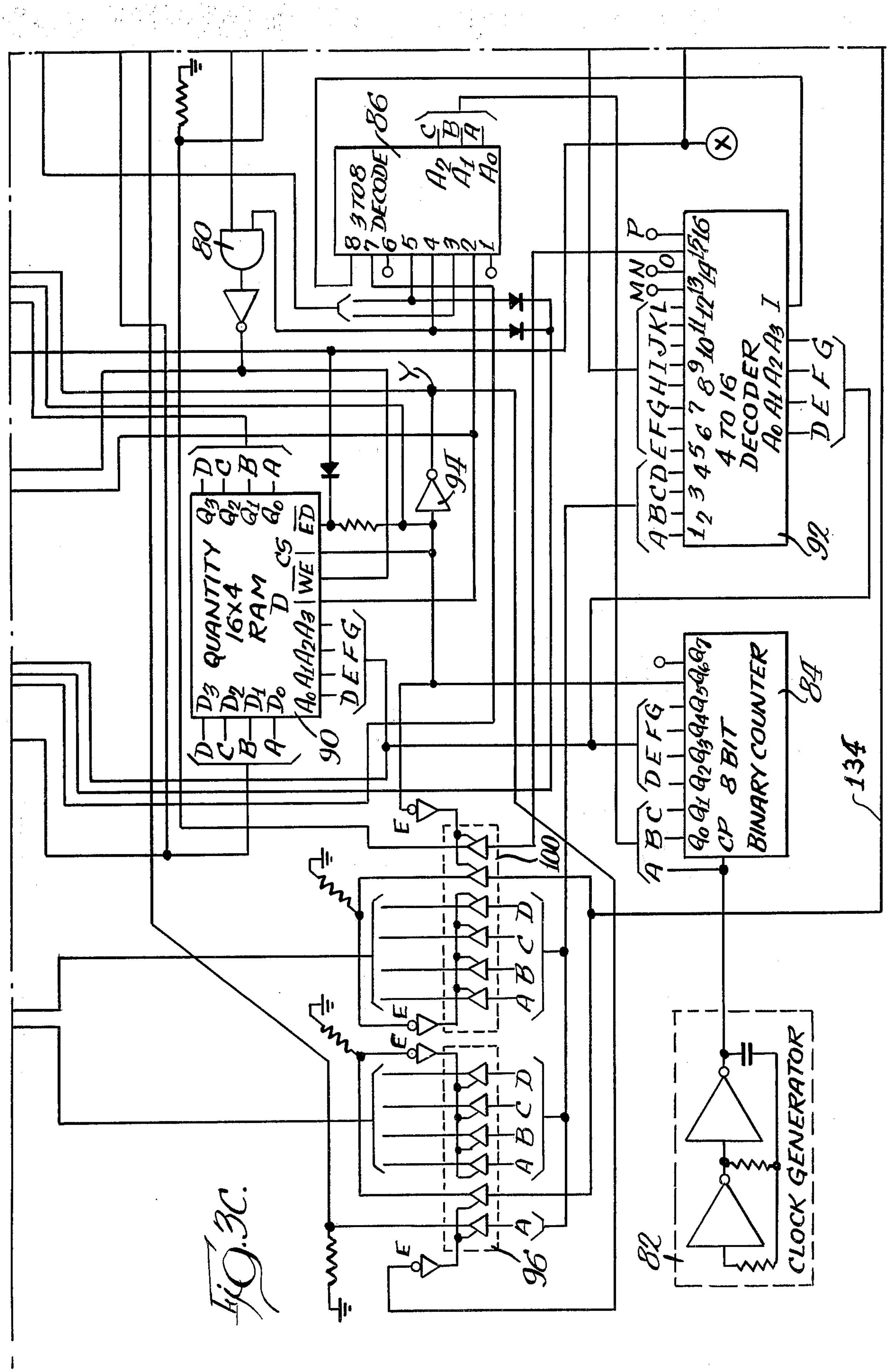
Figure 3D:
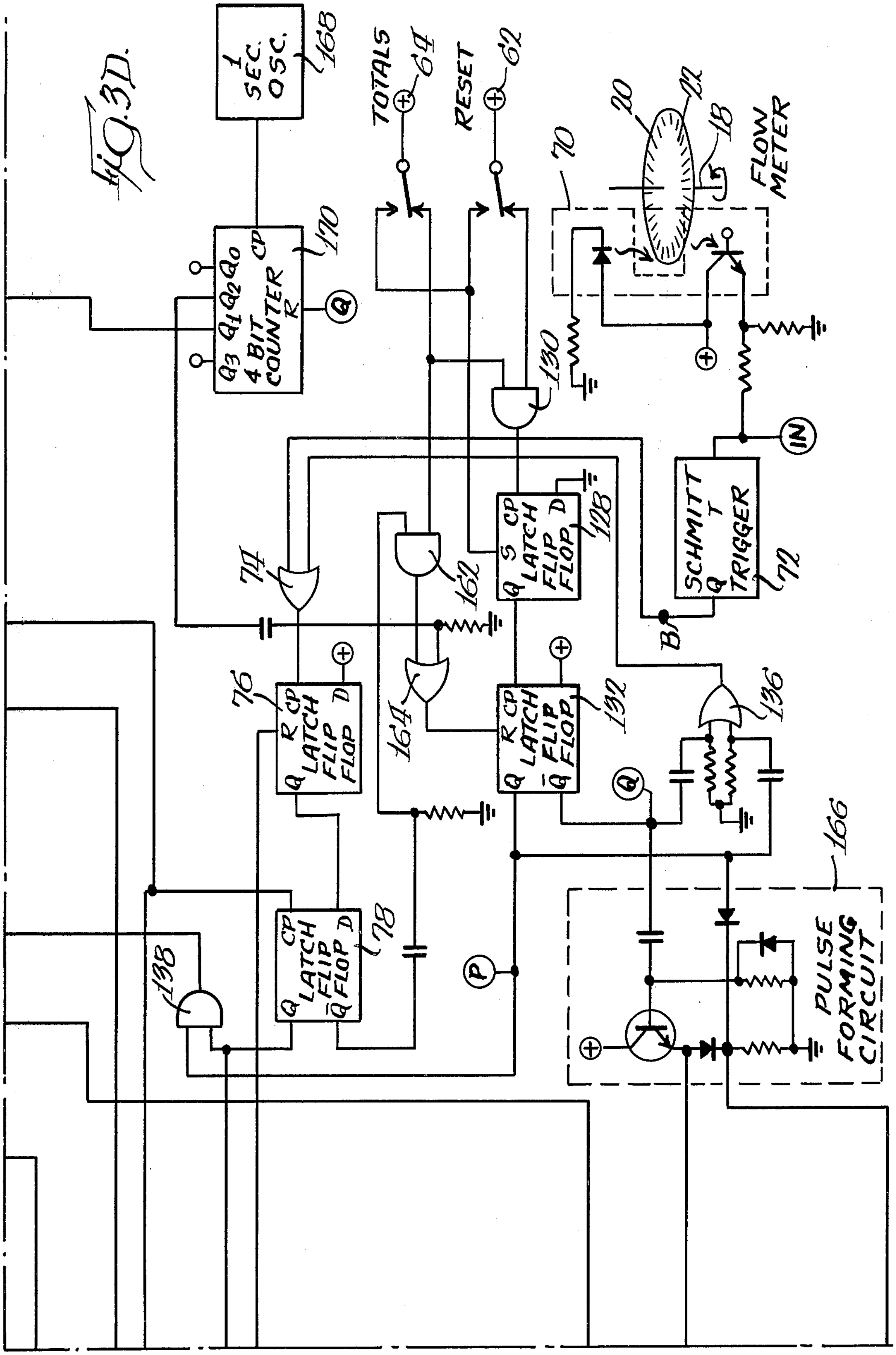

FIG. 3 comprised of FIGS. 3A, 3B, 3C and 3D are a schematic diagram of the computer;

FIG. 4 is a diagram of the pulse doubling circuit; and

FIG. 5 is a schematic of the prerounding circuit.

The quantitative converting computer 10 may be contained within a housing having any particular configuration and the shape is selected in accordance with the requirements of its use. In the event that the quantitative converting computer is to be placed within fuel metering pumps, as gasoline pumps of the common type, the converting computer may have a configuration similar to that shown in FIG. 1. As shown in FIG. 1, computer 10 has a generally rectangular base 12 in which a portion of the electronics is housed and an upwardly extending housing 14 carrying the display 16 as well as the remainder of the electronics. Although not a requirement, this particular configuration is advantageous when the computer 10 is to be retrofitted within the shell of existing gas pumps. In that case, base 12 rests upon a platform (not shown) within the gas pump. An upwardly extending shaft 18, which is coupled to the metering system of the fuel pump, rotates as the gasoline is metered from the storage tanks to the consumer's automobile. A disc 20 mounted on shaft 18 has holes 22 around its perimeter. The computer 10 has an optical sensing device 24 which detects the presence of light pulses passing through holes 22 as disc 20 rotates in response to delivering gasoline to the consumer. The number of holes in disc 20 depends upon the number of revolutions the disc rotates per unit quantity of fluid delivered, as two revolutions per gallon. The selection of a particular plate having a specific number of holes depends upon the capability of the computer, as will be discussed in greater detail below. During operation, and as disc 20 rotates, the display 16 indicates the quantity of fluid measure as well as the cost of the quantity, as preset by the operator. Specifically, a five-digit display section 26 indicates the cost, as in dollars, of the quantity being measured and five-digit display section 28 indicates the quantity, as in gallons, being measured as disc 20 rotates. Displays 26 and 28 may be provided on the opposite side of the housing 14 so that the display 16 may be provided on both sides of the pump. Also, dummy price wheels 30 are of no operational significance, but when set, the price per unit quantity is displayed for the benefit of the consumer.

Power is provided to computer 10 by line 32 and the computer may be reset after each sale by the rotation of reset shaft 34 which is responsive to an attendant-operated lever.

As an additional feature, computer 10 is capable of providing an indication of the total quantity of fluid delivered by the pump and the corresponding total amount of money. The totals of the quantity and money are acquired by the attendant pulling flexible line 36 which operates the totals read switch within the unit. To provide an accurate reading of the totals, money and units delivered, the display 16 employs the five-digit display segment 26 together with the five-digit display segment 28 as a ten-digit display, reading from left to right and top to bottom. As will be explained in greater detail below, upon pulling flexible line 36, the quantity and the corresponding amount of money is displayed on display 16, first one, and then the other. Also, the nonvolatile memory is provided with updated total information each time the computer is reset. The memory is not cleared by the turning of reset shaft 34 and provides for record keeping of the unit on a day-to-day basis.

Although the system described herein is particularly useful in the measurement of gasoline from pumps, it is to be understood that the system also has a number of applications in any environment where a display of quantity as well as a simultaneous display of an arithmetic conversion to other units or to a monetary value is desired. Also, the terms gallons and dollars will be occasionally used for purposes of explanation, it being understood that other units of quantity and monetary value could equally be employed by computer 10.

Referring to FIG. 2, a simplified explanation will now be provided regarding the functional operation of computer 10. During the explanation of the operation, some circuits will not be discussed, most of which provide housekeeping functions for the computer. The computer 10 is provided with a clock circuit 38 which coordinates the operation of substantially all the circuits within the computer. Money and quantity pulser circuit 40 is coupled to money set circuit 42 and to quantity set circuit 44. A pulsing type function is provided by money and quantity pulser 40 to the money set and quantity set circuits 42 and 44, respectively, as controlled by the detection of a change of light from circuit 24 as disc 20 rotates. Each time a pulse is received by money and quantity pulser circuit 40, pulsing functions are generated simultaneously therefrom, one provided to the money set circuit 42 and the other to the quantity set circuit 44.

The money set circuit 42 includes a switchboard having a plurality of operator-selected switches, such as DIP switches, which are preset to provide the cost per unit of quantity. For example, the money set circuit could be set at 95.9 cents per gallon. Upon the reception of a pulsing type function from pulser 40, money set circuit 42 provides a signal corresponding to the amount of money set by the money set circuit 42 to money adder 46. Money adder 46 then adds that amount, as received by money set circuit 42, to the money memory 48. Money memory 48 stores the sum from money adder 46. Upon the reception of a second pulse from money and quantity pulser circuit 40 through money set circuit 42, money adder 46 adds the previously stored cost in money memory 48 to the value received from money set circuit 42 which updates money memory 48. This operation occurs each time a pulse is received from light source circuit 24. The output of money adder 46 is provided to the nonvolatile totals memory 52, and the output of money memory 48 is provided to the seven segment decoder 50.

Upon the reception of the pulse from the money and quantity pulser 40, the quantity set circuit 44 is also provided with a pulsing type function simultaneously with that received by money set circuit 42. The pulsing type function is provided to the quantity set circuit 44 to generate a signal representing an incremental unit of quantity to the quantity adder 54, the value of which is proportional to the quantity set by the operator in the quantity set circuit 44 by way of a switchboard such as a plurality of DIP switches. The quantity set circuit 44 provides a signal to quantity adder 54 for every incremental amount of quantity received as determined by the reception of a pulse from money and pulser circuit 40. For example, if gallons are to be measured and it is required that the computer 10 have a resolution of a thousandth of a gallon, quantity set circuit 44 would provide a signal representative of a thousandth of a gallon to the quantity adder 54 upon the reception of each pulsing type function from money and quantity pulser 40. Thus, the accuracy of the entire system is as great as the number of pulsing type function increments (as 1,000) as pulsed by money and quantity pulser 40. Upon the reception of a signal indicative of the incremental quantity, the quantity adder 54 adds that increment of quantity to quantity memory 56. Upon the reception of the next pulsing type function, the quantity adder 54 adds the previously stored quantity from quantity memory 56 to the new information, thus updating the quantity memory circuit 56. The output of the quantity adder 54 is provided to the nonvolatile totals memory 52, and the output of quantity memory 56 is provided to the seven-segment decoder 50.

It is important to note that upon the reception of pulse from light source 24, both the money and the quantity information are updated simultaneously to provide current cost and quantity information to the seven-segment decoder 50. Also, a round-off function of cost is desirable, and initial round-off injection 58 may be employed to add a signal representative of a predetermined round-off value so that the least significant digit of the seven-segment display 26 accurately displays the quantity measured. The initial round-off injection circuit 58 in effect adds a five to the first lesser significant digit of the least significant digit shown in the five-digit display segment 26.

The seven-segment decoder 50 is provided with information from the money memory 48 and the quantity memory 56. The seven-segment decoder 50 controls the five-digit display segment 26 and the five-digit display segment 28, which together form display 16. Each of the individual elements or digits of the display 16 is made up of seven individually operated segments or bars. The seven-segment decoder 50 controls each of the individual digits of the five-digit display segments 26 and 28 in a sequential manner. The rate at which the seven-segment decoder 50 controls the five-digit display segments 26 and 28 is sufficiently rapid so that all the digits of the display appear to be on simultaneously. The seven-segment decoder 50 is sequenced by the digit sequencing circuit 60 which operates in a manner which continually updates each of the digits of each display during the operation of the computer.

When a sale is complete and the cost and the quantity of the liquid is displayed on the five-digit display segments 26 and 28, respectively, it is desirable to reset the computer for the next sale. In such case, the money and quantity reset switch 62, coupled to zero reset shaft 34 (FIG. 1), set the money memory 48 and the quantity memory 56 to zero. Also, when money and quantity reset switch 62 is closed, nonvolatile totals memory 52 is updated with the total amount of money provided by money adder 46 and the total amount of quantity from quantity adder 54 at the end of the sale.

Nonvolatile totals memory 52 keeps a running total of the money from money adder 46 and the quantity from quantity adder 54, and is updated at the end of each sale so that a daily record of both quantity and money may be maintained. Nonvolatile totals memory 52 is responsive to the totals read switch 64 which, in turn, is closed when flexible line 36 (FIG. 1) is pulled by the operator. In such case, digit sequence circuit 60 appropriately handles the data from the nonvolatile totals memory 52 and employs both the five-digit display segment 26 and the five-digit display segment 28 to provide a ten-digit display for quantity and price.

Referring to FIGS. 3A–3D, the operation of the computer 10 will now be described. Disc 20, having holes 22, is attached to shaft 18 and rotates in the manner described above. Optical sensor circuit 70 provides a pulse to Schmitt trigger 72 to square the pulse from the optical sensor 70. The output of the Schmitt trigger is provided to OR gate 74 and is stored in latch 76. As will be discussed in detail below, the system operates by successively repeating a sequence of thirty-two words. Each word has eight bits. During the presence of the thirty-first word of the thirty-two word series, latch 78 acquires the pulse from latch 76. If the data level is high on the Q output of latch 78, AND gate 80 transfers a WRITE pulse generated by clock generator 82, binary counter 84, and decoder 86 to WRITE ENABLE inputs of the price CMOS memories 88 and to the quantity memory 90. After the thirty-second word, the last word in the series, the count returns to the first word. During the first word, input latch 76 is reset to await the possible presence of the next input pulse from Schmitt trigger 72.

The decoder 86 provides housekeeping functions for computer 10. Specifically, clock generator 82, providing a 500 KHz squarewave, triggers an 8-bit binary counter 84. The clock, with counter bits 1 and 2 of binary counter 84, is decoded by the three to eight decoder 86 to provide eight individual timing pulses. The output pulses from decoder 86 are as follows: bit #1 is not used, bit #2 is entitled CMOS memory read enable, bit #3 is core memory read, bit 190 4 is CMOS memory write enable, bit 190 5 is core memory write, bit #6 is not used, bit #7 is adder carry latch, bit #8 is word pulse blanking. Bits #4 and #5, combined, are adder carry and gate. The 8-bit sequence occurs during each of the thirty-two words. The third through the sixth bits of binary counter 84 are decoded into sixteen word bits by decoder 92 and internally by price and quantity memories 88 and 90, respectively. The seventh bit of binary counter 84 and its complement, provided by inverter 94, control two groups of words, each group having sixteen words. Four consecutive bits, the first through the fourth, of decoder 92 are transmitted by gated hex buffer 96 to numeral preset switch 98 during the presence of the first group of words. Likewise, the first through the fourth bits of decoder 92 are transmitted by gated hex buffer 100 to numeral preset switches 102 during the presence of the second group of words. Both numeral preset switches 98 and 102 are encoded to binary decimal code by encoder matrix 104. Numeral preset switches 98 are operator-controllable, and set the price. Numeral preset switches 102 are also operator-controlled and set the quantity. The output of the encoder matrix 104 is processed in the binary decimal adder 106. Binary decimal adder 106 is functionally equivalent to the money adder 46 and the quantity adder 54, as shown in FIG. 2.

The sum of numerical switch 98 and the output of quantity memory 90 is added in adder 106 and written into quantity memory 90 during the presence of the first sixteen words (during Group 1 enable). Likewise, the sum of numerical switch 102 and the output of the price memory 88 is added in adder 106 and written into memory 88 during the second group of sixteen words (during Group 2 enable). Memories 88 and 90 have an output latch providing integrity of information during write-in. The write-in of memories 88 and 90 is initiated with a system execute pulse. Latch 108 retains any carry-over from binary decimal adder 106 during each word, and inserts that data by way of enabling AND gate 110 into binary decimal adder 106 during the next consecutive word. Therefore, each input-execute pulse adds the value established by the numerical preset switches 98 and 102 into memories 88 and 90, respectively, once for the thirty-two words.

Information on data bus 112 is stored in quad D latch 114. The information is stored and decoded in the seven-segment decoder 116, augmented by segment drivers 118 and presented visually to display 16. Memory data, or information on bus 112, is secured by the quad D latch 114 sequentially upon the appearance of each set of thirty-two words. Thus, 256 words are sequenced for a complete eight-digit display sequence. The scan of display 16 is developed by 4-bit counter 120 provided to decoder/multiplexer 122 augmented by digit drivers 124 providing display 16 with digital sequencing. The 4-bit counter 120 is decoded into eight bits by multiplexer 126 to a corresponding digit (word) of decoder/multiplexer 122. When a level high from decoder 92 matches the level of multiplexer 126, an output, Z, from multiplexer 126 enables E, the quad D latch 114, capturing the 4-bit code for that word (digit). When the decoder 92 reaches the thirty-first word through hex buffer 96, the thirty-first word command enters the clock pulse into 4-bit counter 120 which is then advanced to the next word (each word represents a digit). Also, the thirty-first word command enters exclusive OR gate 128, providing an inversion on the output. The inverted signal is provided to the seven-segment decoder 116, causing it to acquire the data or the information from quad D latch 114 for the display 16. It is in this manner that the seven segments of each of the displays are controlled sequentially to provide the total display 16.

The operation of money and quantity reset switch 62 and totals read switch 54 are similar and will now be described. Both totals and reset switches 62 and 64 are shown in their normally off position. When either switch is turned on by the operator, latch 128 forces Q high. When either switch 62 or 64 is off, as is normally the case, AND gate 130 triggers latch 128 to reset, i.e., $\bar{Q}$ being high. During system reset, latch 128 provides a high output on line Q, triggering totals latch 132. Totals latch 132 disables buffers 96 and 100 by line 134, thereby disabling numerical preset switches 98 and 102. The output of totals latch 132 is also provided to OR gate 136, resulting in a short pulse to OR gate 74, thereby generating the execute command for one complete memory cycle. Totals latch 132 also combines with the output of latch 78 to produce a high level on the output of AND gate 138. This output enables core memory read one-shot 140 and write one-shot 142. Read one-shot 140 enables read sources 144, causing current flow through nonvolatile core memory 146. Current flow through core memory 146 is therefore provided to diode coupler 148 and synch digit drivers 150. The synch digit drivers 150 scan each word operated by decoder 92.

Core information is amplified by four sense amplifiers 152, level translated by interface circuits 154 and stored in quad D latch 156. Core memory permanent totals stored in quad D latch 156 are then transferred to binary decimal adder 106 by way of a data bus and added with output data from the price and quantity memories 88 and 90. The output of the binary decimal adder 106 sends 4-bit data to write data drivers 158. Write one-shot 142 enables drivers 158, causing current to flow in the core data memory lines. Write one-shot 142 also enables write sources 160, causing current to flow through nonvolatile core memory 146 through diode coupler 148 to synch digit drivers 150 operated by the decoder 92 in digit sequence. Coincidence currents from write data drivers 158 and write source 160 cause the data to be stored in nonvolatile core memory 146.

When the thirty-two word cycle is complete, latch 78 changes its state wherein $\bar{Q}$ is high. The pulse is differentiated to a pulse through AND gate 162 and OR gate 164, resetting totals latch 132. The $\bar{Q}$ output of latch 132 is differentiated by OR gate 136 to a pulse through OR gate 74, triggering latch 76. The $\bar{Q}$ output of latch 132 is simultaneously differentiated by pulse-forming circuit 166 to produce a pulse having a duration greater than a thirty-two word cycle. The pulse from the pulse-forming circuit 166 disables memory data outputs from the price memory and quantity memory, 88 and 90, respectively. The previous system cycle is performed except that nonvolatile core memory 146 and quad D latch 156 are normally inactive, causing binary zeroes to be inserted into the price memory 88 and quantity memory 90. Readout displays then show numeral zeroes.

Activating the totals recall switch 64 causes the same cycling as described with respect to the depressing of the reset switch 62, as explained above, with the following exceptions: AND gate 162 is disabled, thereby preventing the signal from latch 78 from triggering the reset of latch 132. This inhibits the zeroing sequence. The totals written into the price and quantity memories 88 and 90, respectively, can be selected for display. An oscillator 168 and a 4-bit counter 170 form a timer connected to exclusive OR gates 172, 174 and 176 to scan the quantity and display it, using 5-digit display segments 26 and 28, and then, after displaying the quantity information, scanning the price digits and displaying them on the 5-digit display segments 26 and 28. Exclusive OR gate 172 also controls the decimal point drivers 178, the decimal points matching the display change during the totals recall. When totals latch 132 is activated, AND gates 180 and 182 change the output of the 4-bit counter 120 for the proper word group selection, i.e., quantity or price. After both quantity and price have been displayed, the counter 170 provides a pulse through OR gate 164 to initiate the zeroing cycle.

The regulated power supply 184 provides DC to all circuits except the price memory 88 and the quantity memory 90. Current to these two circuits is provided by backup battery 186. Thus, emergency read switch 188, when closed, allows the read-out of the information in the price and quantity memories during a power failure.

The initial round-off injection circuit 58 as shown in FIG. 2 is shown schematically in FIG. 5, and will now be described. Point X (FIG. 5) is high during the zeroing cycle and is combined with Group 2 enable (point Y) through AND gate 190. The output of AND gate 190 is provided to AND gate 192, where it is combined with the fourth digit (word) of decoder 92. The output of AND gate 192 is provided to diodes 194 and 196. The outputs of the diodes are connected to the first and third bits of the binary decimal adder 106, thereby entering a decimal number 5 into the circuit.

Finally, it is important to note that the disc 20 may have half as many holes on it as compared to discs of the prior art. This is the result of a pulse edge detector circuit as shown in FIG. 4. The pulse edge detector circuit shown in FIG. 4 is responsive to the 1 to 0 transition of optical sensor 70 as well as the 0 to 1 transition thereof. Specifically, the circuit obtains two trigger pulses from one input pulse. If this circuit is to be employed, the connection between Q of the Schmitt trigger 72 and point B is disestablished. The trigger pulse from the output of Schmitt trigger 72 enters the pulse edge detector at Trigger Pulse In. One-shot 200 provides a pulse from a level high, and one-shot 202 provides a pulse from level low. OR gate 204 combines the pulses at point B entering OR gate 74.

I claim:

1. A system for calculating and displaying the quantity and cost of dispensed quantities of a flowing liquid comprising:

detecting means for detecting the passing of a predetermined quantity of liquid;

means responsive to the detecting means for providing a first signal each time the predetermined quantity of liquid is detected;

means responsive to the first signal for generating a second signal representative of a desired incremental value of the quantity of the liquid each time the first signal is received;

means responsive to the first signal for generating a third signal representative of a desired cost of the liquid per incremental value of the quantity of the liquid;

means for storing the second and third signals;

means for adding the stored second and third signals with subsequently received second and third signals to provide updated second and third signals;

display means including a visual display section having a plurality of digits for displaying cost, and a visual display section having a plurality of digits for displaying quantity;

means for converting the updated second and third signals into a display of quantity and cost in said display means;

means for resetting the system after dispensing a desired quantity of liquid;

nonvolatile core memory means responsive to the resetting means for accumulating and storing the updated second and third signals each time the system is reset to provide a totals signal for the quantity and cost of all quantities of liquid dispensed; and means for causing said totals signal to be displayed by said display means.

2. The system of claim 1 wherein the last named means comprises a totals read switch.

3. The system of claim 1 further including an initial round-off injection circuit coupled to said means for generating a third signal for adding a round-off value to the third signal.

4. The system of claim 1 wherein the desired incremental value of the quantity is established by a first matrix of operator-controlled switches.

5. The system of claim 4 wherein the desired cost is established by a second matrix of operator-controlled switches.

6. The system of claim 1 wherein the detecting means includes a light sensor and the means responsive to the detecting means provides the first signal each time light impinges on the light sensor and each time the light is removed from the light sensor.

7. A system for calculating and displaying the quantity and cost of dispensed quantities of a flowing liquid comprising:

detecting means for detecting the passing of a predetermined quantity of liquid;

means responsive to the detecting means for providing a first signal each time the predetermined quantity of liquid is detected;

means responsive to the first signal for generating a second signal representative of a desired incremental value of the quantity of the liquid each time the first signal is received;

means responsive to the first signal for generating a third signal representative of a desired cost of the liquid per incremental value of the quantity of the liquid;

means for storing the second and third signals;

means for adding the stored second and third signals with subsequently received second and third signals to provide updated second and third signals;

means for converting the updated second and third signals into a display of quantity and cost;

means for resetting the system after dispensing a desired quantity of liquid; and nonvolatile core memory means responsive to the resetting means for accumulating and storing the updated second and third signals each time the system is reset to provide a totals signal for the quantity and cost of all quantities of liquid dispensed, said means for converting the updated second and third signals into a display of quantity and cost including a five-digit visual display section for displaying cost wherein each digit display has seven segments, and a five-digit visual display section for displaying quantity wherein each digit display has seven segments, said means for causing said totals to be displayed comprising a totals read switch and means responsive to the totals read switch for converting the totals signals suitably to cause both five-digit display sections to be used to form the visual display for each total in said display means.

8. The system of claim 7 further including means for sequentially displaying each digit of the visual display.

9. The system of claim 7 further including means for providing a decimal point in each of the five-digit display sections.

10. The system of claim 9 further including means coupled to said means for providing a decimal point for selecting the position of the decimal point.

11. The system of claim 7 wherein the first signal occurs at a rate no greater than the rate required to obtain the least significant digit of each of the five-digit display sections.

* * * * *